Patented Aug. 19, 1952

2,607,732

UNITED STATES PATENT OFFICE 2,607,732

LUBRICANTS

Karman Duchon, Lansing, Ill., and Frederick H. MacLaren, Munster, Ind., assignors to Standard Oil Company, Chicago, Ill., a corporation of Indiana No Drawing. Application June 21, 1950, Serial No. 169,533

6 Claims. (Cl. 252—37)

This invention relates to lubricants and more particularly to lubricants for use under high temperatures and/or extremely high pressures.

Heretofore, the lubrication of metal surfaces which are at high temperatures due to the extremely high load pressures of operation, or due to the fact that the contacting metal surfaces are in a zone of variable wide temperature range has been inefficient and generally unsatisfactory. For example, ambient temperatures may be as low as −40° F. at "starting up" operations with shearing surfaces heating up rapidly to temperatures requiring a lubricant of extreme pressure properties. Thus, a satisfactory lubricant for the required service described above must be capable of providing a flexible, adhering lubricated surface at relatively low temperatures and also provide extreme pressure lubricating properties at elevated temperatures.

The lubrication of metal surfaces which are subjected to repeated or continuous contact with another metal surface under pressure of the order of 30,000 p. s. i., which pressure develops temperatures up to about 300° F., has posed a difficult problem in lubrication. An example of this problem is the lubrication of the rotating cams of the Bucyrus Monighan walking dragline which is used for strip mining in a soft or boggy ground. Such an apparatus may be used in localities where atmospheric temperatures are exceedingly low, that is, −40° F., or lower. The cams of this machine actuate moving pontoons which enable the dragline to "walk." At particular points in the rotation of the cam, the cams rest on a bearing surface and support the entire weight of the dragline and at such times extremely high pressures are developed. The most commonly used type of lubricants for these bearing surfaces have not been adequate. The pressures developed during operation are of such magnitude that most of such lubricants is squeezed out of the open bearing surface, leaving an insufficient film of lubricant and necessitating very frequent application of the lubricant to insure at least the very minimum of lubrication. Almost all of the lubricant is wasted and considerable man hours are employed in the frequent application of this lubricant. The lubricating material should hence be one which is of sufficiently high viscosity on account of the high temperature conditions and extremely high shock loads. It must be one which is sufficiently adhesive to the metal surface. It must be in a form which is easily applied to the surface to be lubricated. The lubrication of many of the open or semi-open gears in steel mills pose the same problem. The lubricant must have a sufficiently high viscosity to be capable of lubricating under conditions of high temperature and heavy loads and yet the lubricant must be sufficiently adhesive so that it will not be thrown off the gears after each application. It must have water-resistant properties, and must be in a form which is easily applied.

An object of the present invention is to provide a lubricant which will withstand severe operating conditions of high temperatures and shock loading. Another object of the invention is to provide a lubricant having increased resistance to heat and increased adhesion to metal, adapting them for use under severe operating conditions. A further object of the invention is to provide a lubricant which is easily applied and which is capable of withstanding extremely high pressures without being forced out from between bearing surfaces. Still another object of the invention is to provide a lubricant which will withstand severe operating conditions of high temperatures and shock loading and which will not become brittle and crack under low temperature conditions. Other objects and advantages will become apparent from the following description.

In accordance with the present invention a lubricant fulfilling the above objects is one comprising essentially from about 50% to about 95% of an asphalt, from about 5% to about 30% lead naphthenate and from about 1% to about 20% of an olefin polymer having a molecular weight of from about 500 to about 25,000, preferably a polymer of an olefin monomer having not more than about 6 carbon atoms, for example, a monomer having 3 or 4 carbon atoms. To facilitate the application of the lubricant under certain conditions, it is sometimes desirable to modify the viscosity by the addition of a diluent which is volatilized at a temperature above about 150° F.

The asphalt used in the above lubricant composition can be either a naturally occurring asphalt, an asphalt obtained as a residue in the distillation of certain types of petroleum, or a blown asphalt obtained by the air-blowing of residuum of the distillation products of certain types of petroleum. The physical characteristics of the asphalt can be varied depending upon the operating conditions to which the lubricant is subjected. Suitable asphalts are those having an ASTM penetration of between about 15 and 110 under a load of 5 grams for 5 seconds at 77° F., and an ASTM ring and ball softening point of between about 260° F. and about 110° F., and preferably asphalts having a penetration of between about 20 and 85 under the above conditions and a softening point of between about 245° F. and about 170° F. When the lubricant of this invention is to be used for the lubrication of heavy machinery normally used outdoors, the asphalt to be used should be one having a higher softening point if the lubricant is to be used under hot climatic conditions, as for summer use; and the asphalt should be one having a lower softening point if the lubricant will be used in the winter or under cold climatic conditions.

The polymers employed in the present invention are polymers resulting from the polymerization of low molecular weight olefins, preferably monoolefins, particularly the isomonoolefins or copolymers obtained by the polymerization of hydrocarbon mixtures containing isomonoolefins and monoolefins of less than 6 carbon atoms. Such polymers can be obtained by methods well known in the art, such as by polymerization in the presence of catalysts, such as sulfuric acid, phosphoric acid, boron fluoride, aluminum chloride, and other similar halide catalysts of the Friedel-Crafts type at temperatures of from about 0° F. to about −80° F. Especially suitable polymers are butylene polymers and propylene polymers having molecular weights of from about 500 to about 25,000, preferably from about 1000 to about 10,000. Such polymers can be obtained, for example, by the polymerization in the liquid phase of an isoolefin, an olefin or hydrocarbon mixture containing the same at temperatures below about 0° F., using a metal halide catalyst, such as boron fluoride or aluminum chloride. A suitable stock for the preparation of such polymers is a hydrocarbon mixture containing isobutylene, butylene and butene, recovered from petroleum gases, especially those gases produced in the cracking of petroleum oils in the manufacture of motor fuels.

The lead naphthenate used in the herein described lubricant compositions can be readily prepared by reacting lead oxide with naphthenic acids or with alkali salts of naphthenic acids or by other well-known methods.

Naphthenic acids are complex mixtures of carboxylic acids which occur naturally in various crude petroleum oils, usually in proportions below 1 percent, and which may be extracted therefrom by the use of alkalies. It has been demonstrated that petroleum naphthenic acids fall into at least three general categories: (1) aliphatic acids having the general formula $C_nH_{2n}O_2$ and predominating in compounds wherein $n$ is 6 to 7; (2) acids having the general formula $C_2H_{2n-2}O_2$ and shown to be cyclopentane derivatives $$C_5H_9.(CH_2)_xCO_2H$$

where $x$ generally varies from 1 to about 4, and wherein the cyclopentane ring may also contain one or more alkyl groups; (3) acids having the general formula $C_nH_{2n-4}O_2$ known to contain a bicyclic cycloaliphatic nucleus and containing about 12 to about 25 carbon atoms. The above classification presents a somewhat over-simplified picture; some evidence has been adduced of the existence of even more complex acids in petroleum naphthenic acids, including tri- and tetracyclic cycloaliphatic-substituted carboxylic acids. The molecular weights in the above classes overlap; thus, although the simple aliphatic acids predominate in $C_3$ or $C_7$, small proportions of higher molecular weight fatty acids also occur and overlap into the molecular weights and boiling ranges of compounds falling into categories (2) and (3) above. Naphthenic acids obtained from different crudes and from various fractions of the same crude oil generally differ from each other, somewhat in composition and character. For the purposes of the present invention the naphthenic acids obtained from petroleum or other sources can be suitably employed in the preparation of the lead naphthenate.

As noted above, at times it is desirable to apply the lubricant in a thinned or diluted form to facilitate its application. Suitable diluents which are employed in quantities of from about 5% to about 20%, are aliphatic, cycloaliphatic and aromatic hydrocarbons boiling above about 200° F., or chlorinated hydrocarbons boiling above about 150° F. Examples of suitable diluents are kerosenes, naphthas, oleum spirit, trichloroethylene, ethylenedichloride, chlorbenzene and aromatic hydrocarbons boiling above about 200° F. An example of a suitable aromatic hydrocarbon is an aromatic petroleum distillate having a distillation range of between about 220° F. and about 330° F., and having a kauri butanol value between about 85 and about 100, or higher. Among the preferred diluents is an aromatic petroleum distillate having a distillation range of between about 275° F. and about 310° F., and a kauri butanol value of about 93 to 97, produced by the hydroforming of a petroleum naphtha by well-known processes, such as for example, the process described in U. S. 2,335,596.

We can also use as a diluent hydrocarbon oils, such as a mineral oil having a Saybolt Universal viscosity at 100° F. of from about 55 to about 100 seconds.

The following examples are illustrative of compositions of the herein described invention and are not to be construed as limitations thereof:

| Examples | I | II | III |
|---|---|---|---|
|  | Percent | Percent | Percent |
| Asphalt[1] | 75 | 50 | 90 |
| Lead Naphthenate | 20 | 30 | 5 |
| Isobutylene Polymer[2] | 5 | 20 | 5 |

[1] Softening point (ASTM ring and ball) 175° F., A. S. T. M. penetration at 77° F.–80.
[2] Molecular weight 1000.

*Example IV*

|  | Percent |
|---|---|
| Asphalt[1] | 65 |
| Lead naphthenate | 10 |
| Isobutylene polymer[2] | 10 |
| Diluent[3] | 15 |

[1] Softening point (ASTM ring and ball) 110° F., A. S. T. M. penetration at 77° F.–90.
[2] Molecular weight 500.
[3] Hydroformer distillate—distillation range 270° F.–310° F., Kauri Butanol No. 95.

*Example V*

|  | Percent |
|---|---|
| Asphalt[1] | 75 |
| Lead naphthenate | 20 |
| Propylene polymer[2] | 5 |

[1] Same as Examples I–III.
[2] Molecular weight 1000.

*Example VI*

|  | Percent |
|---|---|
| Asphalt[1] | 60 |
| Lead naphthenate | 10 |
| Isobutylene polymer[2] | 5 |
| Diluent[3] | 25 |

[1] Same as Example IV.
[2] Molecular weight 10,000.
[3] Same as Example IV.

Example VII

| | Percent |
|---|---|
| Asphalt[1] | 70 |
| Lead naphthenate | 16 |
| Isobutylene polymer[2] | 8 |
| Diluent[3] | 6 |

[1] Same as Examples I-III.
[2] Molecular weight 1000.
[3] Petroleum distillate oil having Saybolt Universal viscosity at 100° F. of 80-85 seconds.

The herein described lubricant can be prepared by adding the lead naphthenate to the molten asphalt polymer mixture and agitating the mixture until a uniform homogeneous product is obtained. The composition is then partially cooled and filled into suitable containers. In preparing the diluted lubricant the mixture of molten asphalt and lead naphthenate dissolved therein is cooled to a temperature below that at which the diluent evaporates and the diluent gradually added while the mixture is being agitated until a uniform homogeneous product is obtained. The mixture is then further cooled and then filled into containers. If desired, of course, the lead naphthenate may be dissolved or dispersed in the diluent and the lead naphthenate and diluent mixture added to the asphalt which is heated to a sufficiently elevated temperature to melt the asphalt at a temperature below that which the diluent will evaporate.

If desired, fillers such as talc, natural asphaltic materials such as gilsonite, graphite, vermiculite, etc., can be added to the herein described lubricant composition.

All percentages expressed herein and in the appended claims are weight percentages.

Lubricant compositions consisting essentially of lead naphthenate and a major proportion of asphalt are claimed in the copending application of D. R. Oberlink and W. C. Fredericks Serial Number 169,534 filed June 21, 1950.

We claim:

1. A lubricant composition consisting essentially of from about 50% to about 95% asphalt, from about 5% to about 30% lead naphthenate and from about 1% to about 20% of an olefin polymer having a molecular weight of from about 500 to about 25,000, said olefin polymer being a polymer of a mono-olefin of less than 6 carbon atoms.

2. A lubricant composition as described in claim 1 wherein the monoolefin polymer is an isobutylene polymer.

3. A lubricant composition as described in claim 1 in which the monoolefin polymer is a propylene polymer.

4. A lubricant composition as described in claim 1 in which the asphalt is a blown asphalt having an ASTM penetration at 77° F. of between about 15 and 110 and an ASTM ball and ring softening point between about 110° F. and 260° F.

5. A lubricant composition consisting essentially of from about 50% to about 95% asphalt, from about 5% to about 30% lead naphthenate, and from about 1% to about 20% of a monoolefin polymer having a molecular weight of from about 500 to about 25,000 and from about 5% to about 20% of a diluent boiling above about 150° F. said polymer being a polymer of a mono-olefin having less than 6 carbon atoms.

6. A lubricant composition as described in claim 5 in which the diluent has a distillation range of between about 220° F. and about 330° F., and a kauri butanol number between 85 and about 100.

KARMAN DUCHON.
FREDERICK H. MacLAREN.

REFERENCES CITED

The following references are of record in the file of this patent:

UNITED STATES PATENTS

| Number | Name | Date |
|---|---|---|
| 2,292,672 | Swenson | Aug. 11, 1942 |
| 2,388,083 | Reswick | Oct. 30, 1945 |
| 2,391,113 | Zimmer et al. | Dec. 18, 1945 |